(12) United States Patent
Brown

(10) Patent No.: US 6,343,794 B1
(45) Date of Patent: Feb. 5, 2002

(54) LUBRICANT SEAL HAVING PARTITION PLATE WITH GUTTER FOR DRIVE MOTOR GEARS AND THE LIKE

(76) Inventor: Donald J. Brown, 5531 Washington Ave., Erie, PA (US) 16509

( * ) Notice: Subject to any disclaimer, the term of this patent is extended or adjusted under 35 U.S.C. 154(b) by 0 days.

(21) Appl. No.: 09/409,817

(22) Filed: Oct. 1, 1999

(51) Int. Cl.$^7$ ................................................. F16J 15/40
(52) U.S. Cl. ........................ 277/423; 277/424; 277/427; 277/429
(58) Field of Search .................................. 277/347, 353, 277/409, 411, 412, 423, 424, 427, 428, 429, 430

(56) References Cited

U.S. PATENT DOCUMENTS

| | | | | |
|---|---|---|---|---|
| 1,945,219 A | * | 1/1934 | Fruhstorfer | 277/423 |
| 2,063,738 A | * | 12/1936 | Hedgcock | 277/423 |
| 4,603,865 A | | 8/1986 | Bien | 277/12 |
| 4,892,200 A | * | 1/1990 | Renk et al. | 277/412 |
| 5,636,848 A | * | 6/1997 | Hager et al. | 277/423 |
| 5,676,221 A | * | 10/1997 | Renk et al. | 277/412 |
| 6,109,615 A | * | 8/2000 | Gildea et al. | 277/349 |

* cited by examiner

Primary Examiner—Anthony Knight
Assistant Examiner—Enoch E Peavey
(74) Attorney, Agent, or Firm—Lovercheck & Lovercheck P.C.

(57) ABSTRACT

A lubricant seal having no wearing surfaces is provided with a partition plate having a gutter portion and a slinger supported in a labyrinth cavity. This lubricant seal is particularly useful in larger seal applications where the wear of the rotating shafts exceeds the wear characteristics of available seal material. Migrating lubricants are captured in the gutter portion of the partition plate and are directed through the gutter portion around and below the shaft where the lubricant is returned through a drain to a sump.

18 Claims, 9 Drawing Sheets

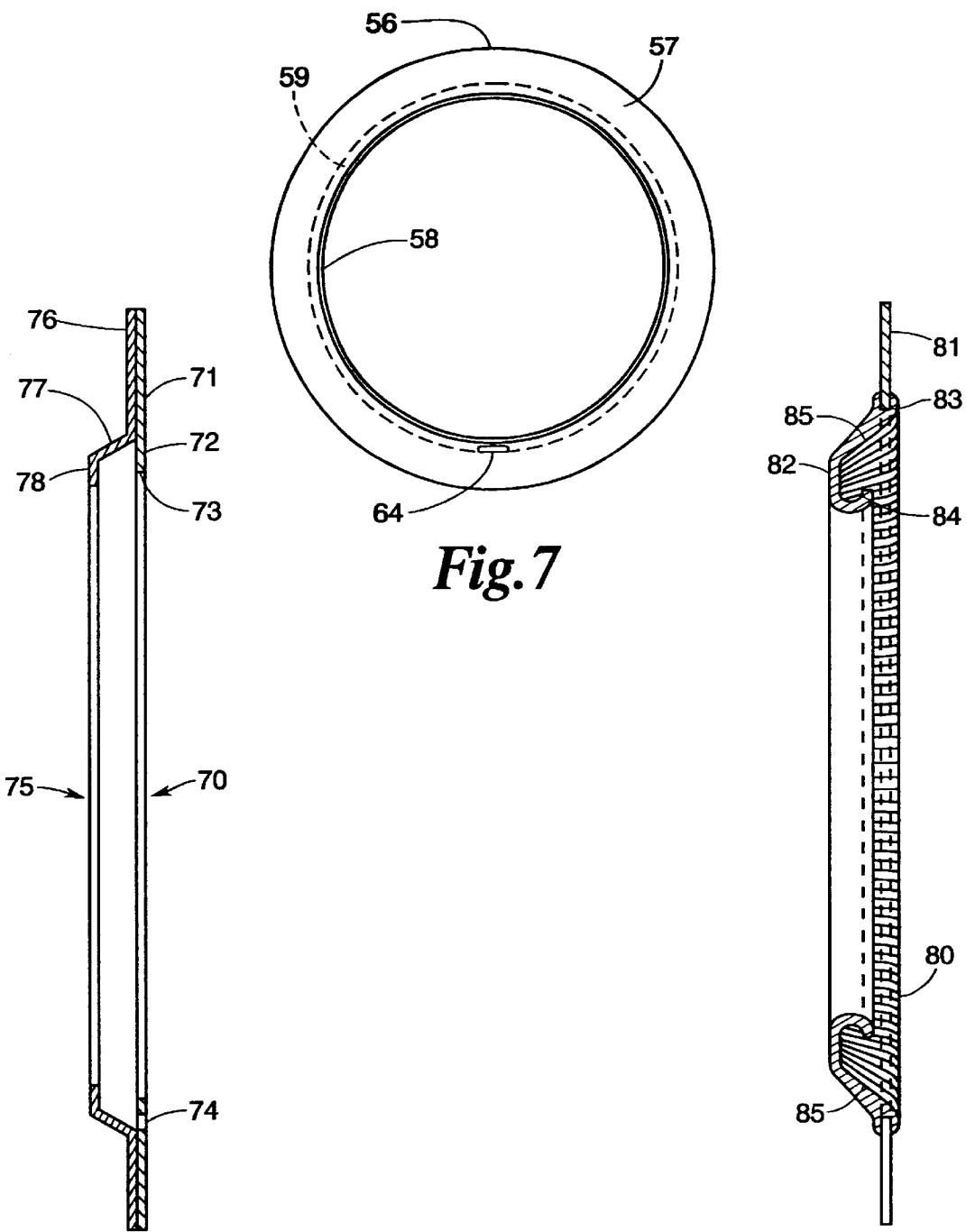

LUBRICANT SEAL HAVING PARTITION PLATE WITH GUTTER FOR DRIVE MOTOR GEARS AND THE LIKE

FIELD OF THE INVENTION

This invention relates to electric motor gear drive systems and the like and to gear lubricant seals for such systems. More particularly, the invention relates to an improved partition plate in a lubricant seal to assist in limiting lubricant loss from an associated gear case and to prevent lubricant migration to the motor shaft bearing and to the environment.

BACKGROUND OF THE INVENTION

It is known in the art relating to electric motor gear use in drive systems for diesel electric locomotives and the like to provide a railway truck mounted axle hung electric traction motor partially supported upon and geared to a drive axle by engaged pinion and drive gears. The gears are lubricated by heavy fluid lubricant contained in a gear case surrounding the gears on the pinion end of the traction motor and on the axle.

To restrict the escape of lubricant from the gear case along the traction motor shaft, the motor is provided with an outer seal. This combines with a shaft mounted oil slinger to direct lubricant escaping past a labyrinth toward internal drain openings in the outer seal through which the lubricant is returned to the gear case. Lubricant migrating past the partition plate is directed to an external drain in the pinion end bearing cover and is lost from the gear case, preventing contamination of bearing grease, but polluting the environment.

Under certain operating conditions, when the lower part of the drive gear is turning in a direction toward the pinion and the lubricant level in the gear case is relatively high, sufficient lubricant may be pushed or thrown toward the pinion to cause a build-up of lubricant in the vicinity of the internal drain openings. This can force lubricant through the openings into the slinger area and result in a loss of lubricant in the gear case. The effect of this condition, as well as the possibility of excess lubricant flow from the pinion along the traction motor armature shaft and into the slinger area, combine to result in the possibility of excess lubricant loss, requiring inspection and replacement of lubricant at shorter than desired time intervals.

SUMMARY OF THE INVENTION

To control the loss of lubricant from escaping the sump through the outer drain applicant has developed an improvement to the partition plate. The improvement returns most of the lubricant that reaches the outer drain and controls or eliminates low sump conditions. The partition can be formed of any material that will maintain its integrity in the range of moderately high to very low temperature operating conditions that may exist in the gear case.

The partition plate is formed to resemble a hook shaped gutter that will catch the lubricant that the partition, when assembled, forms a cavity. When the slinger rotates, the cavity is saturated with lubricant which runs down its faces. As the lubricant runs down partition plate face it is caught in the gutter thus alleviating lubricant to transfer to its outer face and expel to the outer drain.

Lubricant caught in the partition plate gutter is transferred around to its bottom and emptied into the bottom of cavity thus flowing into drain and returned to the sump.

To insure no lubricant will migrate to the back face of partition plate or down the securing bolts bores, a seal between the back mounting faces will be necessary of partition plate and the bearing cover.

The slinger has a flanged diameter with a radius that extends from its face that overhangs the partition plate gutter and allows lubricant remaining on the flange to drip into the gutter and around the radius when rotation has stopped, again transferring lubricant around and into the drain to return to the sump.

Other than drain in outer seal no additional parts are needed other than retaining bolts to secure the seal to bearing cover.

All tolerances between partition plate and slinger should be as close as practical after considering end play and radial run out.

Due to the fact there are no wearing surfaces, performance should continue throughout the life of the motor. If care is taken during disassembly for any reason, partition plate can be reused over and over.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 7 is a front view of the partition plate with first and second walls showing the drain at the bottom to direct lubricant back to the sump;

FIG. 8 is a cross sectional side view a two plate partition plate, the first plate being identical to the partition plate shown in FIGS. 11 and 12, the second plate extending away from the first plate, and then parallel to the first plate forming a gutter;

FIG. 9 is a two part partition plate, the first part being a flat annular metal portion, the second part forming the gutter and may be made of a suitable plastic or composite material, the first part and second part being joined adhesively or other suitable means;

DESCRIPTION OF THE PREFERRED EMBODIMENT(S)

Figure 11:
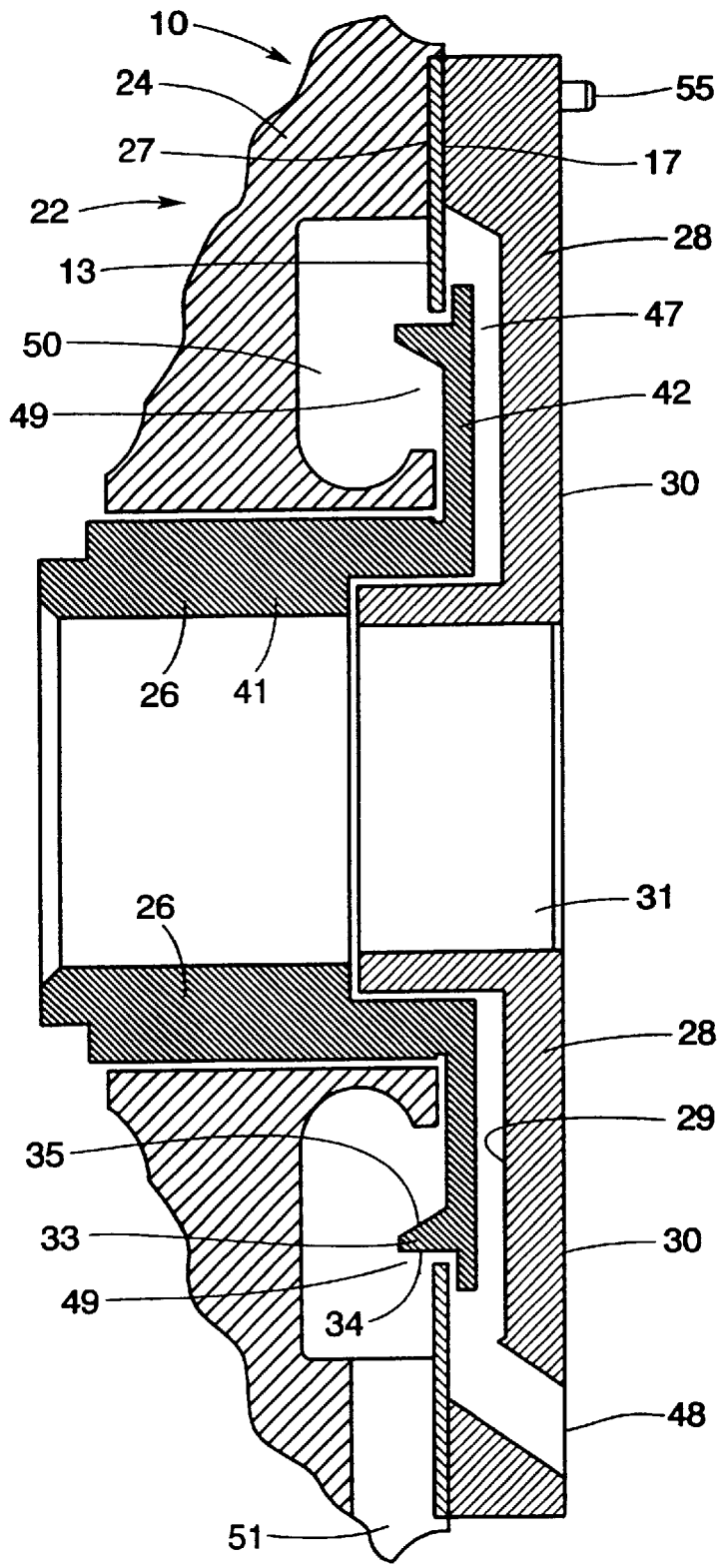
FIG. 11 is a flat annular partition plate as known in the prior art.
Figure 12:
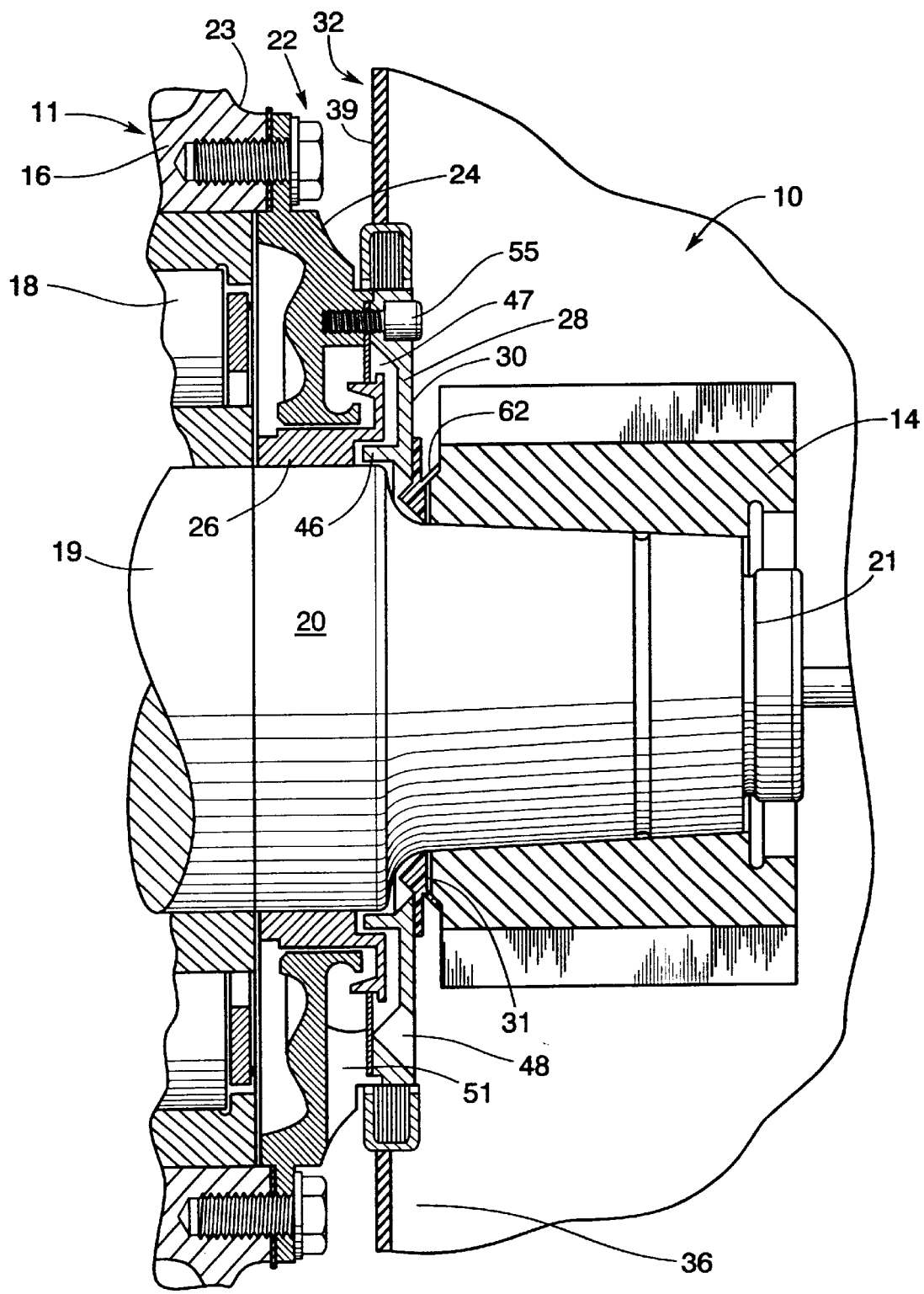
FIG. 12 is a flat annular partition plate as known in the prior art.

Referring now to the drawings in detail and referring in particular to FIGS. 11 and 12, numeral 10 generally indicates the traction motor and axle drive system of a diesel-electric locomotive or the like. System 10 includes an electric traction motor 11 and a wheeled drive axle (not shown) permanently coupled together by a pair of engaged gears, including a pinion 14 and a drive gear (not shown).

The traction motor 11 includes a frame 16 which carries a pair of axially spaced bearings 18. Bearings 18 support a rotatable armature shaft 19 which carries and is rotatable with the traction motor armature, not shown. Near the end of the shaft beyond bearing 18, there is provided a generally cylindrical slinger mounting portion 20 and, outwardly thereof, tapered pinion mounting stub 21 on which the pinion 14 is mounted, such as by shrink fitting in a fixed position.

The traction motor frame 16 includes two major components: the main frame portion which encloses the traction motor field poles and armature (not shown), and the pinion end housing 23 which mounts on the open end of the main frame and carries the pinion end bearing 18. A bearing cover 24, centrally mounted on the end of the pinion end housing, covers the side of the bearing 18, which is preferably permanently grease lubricated, and extends around an oil slinger 26 carried on the mounting portion 20 of the armature shaft and rotatable therewith. A partition plate 27 and a seal 28 having a generally flat pinion surface 30 are fixedly mounted to the exterior of the bearing cover 24 by means of bolts 55. The outer seal 62 includes a central opening 31 through which the pinion mounting stub 21 of the armature shaft extends to mount the pinion near the outer surface 30.

The drive axle 12 is carried in axle bearings, not shown, mounted in the traction motor frame and pinion 14 and the drive gear remain in constant engagement. Lubrication is provided by a heavy special purpose fluid lubricant which for convenience, may be referred to as oil. The lubricant is contained within a gear case 32, which is supported by extensions of the traction motor frame in conventional manner.

The gear case encloses the gears and provides a sump 36 for retention of an adequate volume of lubricant. The gear case includes peripheral walls and side walls, only the inner side wall 39 of which is shown. The traction motor seal 28 has opening 31 which is provided with a seal 62 to prevent loss of lubricant from the gear case.

To further control the escape of lubricant from the gear case along the armature shaft through the opening 31, the outer seal is provided with an annular lip 46 that coacts with a recess in the oil slinger 26 to provide a labyrinth passage into an internal labyrinth annular cavity 47 defined by the outer seal 28, the partition plate 27 and the oil slinger 26. Lubricant which passes up the armature shaft through the opening 31 is thrown into this cavity 47 by the oil slinger and runs downwardly to drain openings 48 of an internal labyrinth drain that directs the fluid back to the inside of the gear case sump 36. If excess lubricant collects in the internal labyrinth cavity 47, it can escape through an opening between the partition plate 27 and oil slinger 26 into an external labyrinth annular cavity 50. There it drains down into external drain openings 51 rather than continuing along slinger clearance between bearing cover and slinger base and into grease cavity whereby contaminating bearing grease which could cause bearing failure which open outside the traction motor and gear case and allow the excess lubricant to escape.

The portions of the drive system so far described represent a known arrangement of the prior art currently in widespread use. While operation of the described mechanism is fully acceptable in most instances, there are possible conditions of service and operation wherein excessive loss of lubricant may occur from the gear case. If, for example, the lubricant level in the gear case is maintained higher than intended, an excess amount of lubricant may migrate up the shaft and into the labyrinth. Some of this lubricant may escape into the external labyrinth and be lost through the drain openings 51. Furthermore, due to wear from the rotation of the pinion 14, seal 62 quickly becomes ineffective allowing lubricant to migrate through opening 31 into the slinger 26 and the seal side cavity portion 47.

The labyrinth structure through which the lubricant migrates includes the bearing cover 24, the seal 28, the side 39 of the gear case 32, collectively this labyrinth structure is referred to as the labyrinth member 22, which encloses the cavity 49.

FIGS. 1 through 4 show the preferred embodiment of the invention. Applicant has found that by adding a gutter portion 45 to the partition plate 27 the resulting partition plate with gutter 43 has a gutter portion 45 which catches lubricant which has migrated past the slinger 26. The gutter portion 45 catches and directs the lubricant around and downwardly and across angled portion 40 to the drain 48 which returns the lubricant to the sump 36 of the gear case 32.

The partition plate 43 with gutter 45 comprises a clamped portion 44 which is clamped between the bearing cover 24 and the seal 28 by means of bolts 55. The partition plate with gutter 43 has a gutter portion 45 which extends into the cavity portion 50 and turns upwardly terminating at end 46 adjacent the lower face 35 of flange 33. To control the loss of lubricant from escaping the sump 36 through the outer drain 51 the partition plate with gutter 43 returns most of the lubricant that would have reached cavity portion 50 to the drain 48. The lubricant is captured in gutter portion 45 and is returned to the cavity portion 47 and routed back to the sump 36 in the gear case 32. The partition plate with gutter 43 can be formed of any material that will maintain its integrity in the range of moderately high to very low temperature operating conditions that may exist in the gear case. The temperature range will be from approximately 350° F. which would be the maximum expected temperature of the oil to a low of ambient air temperature which due to extreme weather conditions may reach 50° F. below zero.

Figure 5:
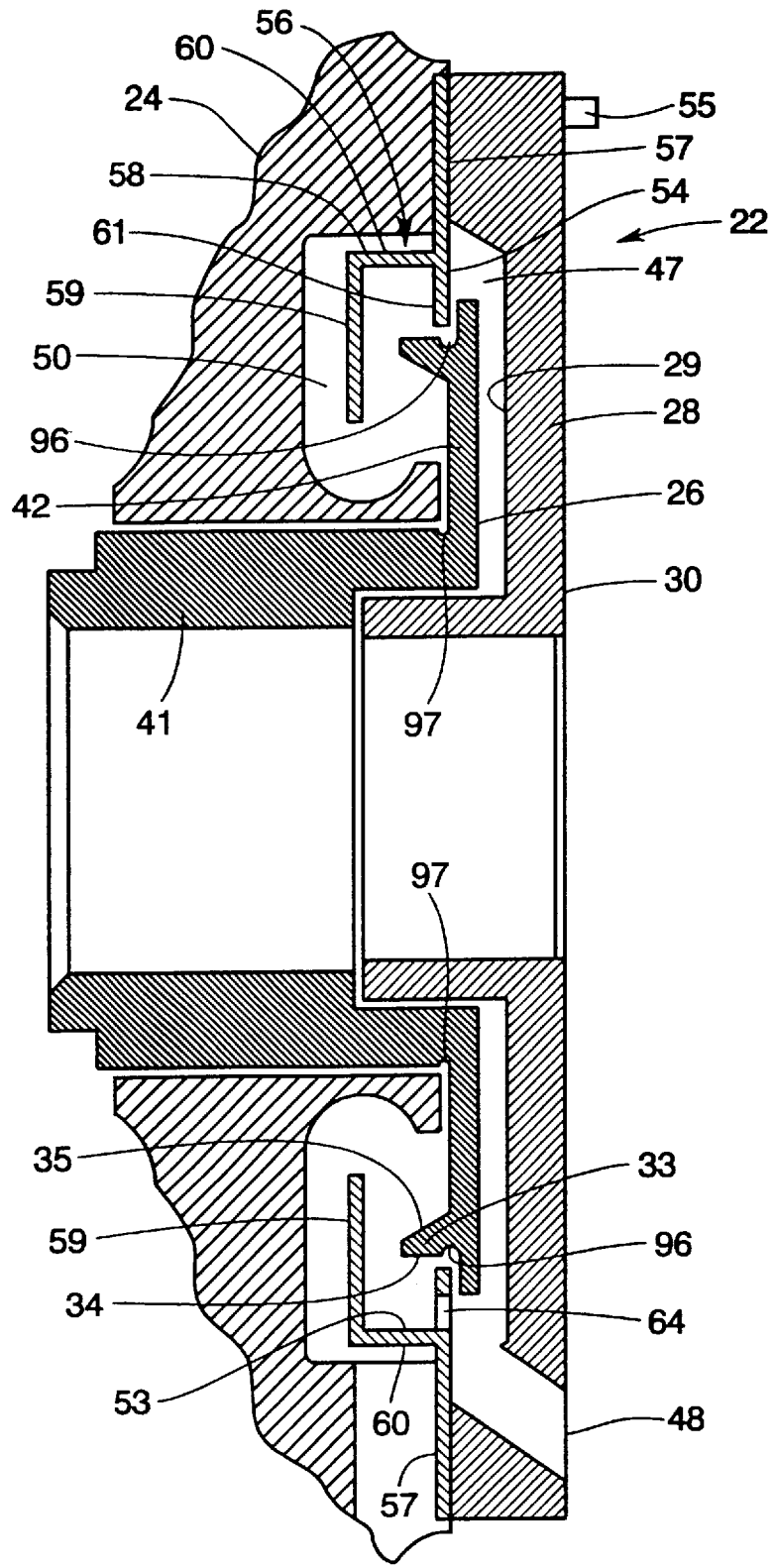
FIG. 5 is a transverse cross-sectional view of another embodiment of the partition plate having a first wall terminate adjacent the slinger and a second wall extending parallel to the first wall forming a gutter inside the cavity. Also shown are drain radiuses in the outer face of the flange of the slinger and in the slinger base adjacent the outwardly extending member.
Figure 6A:
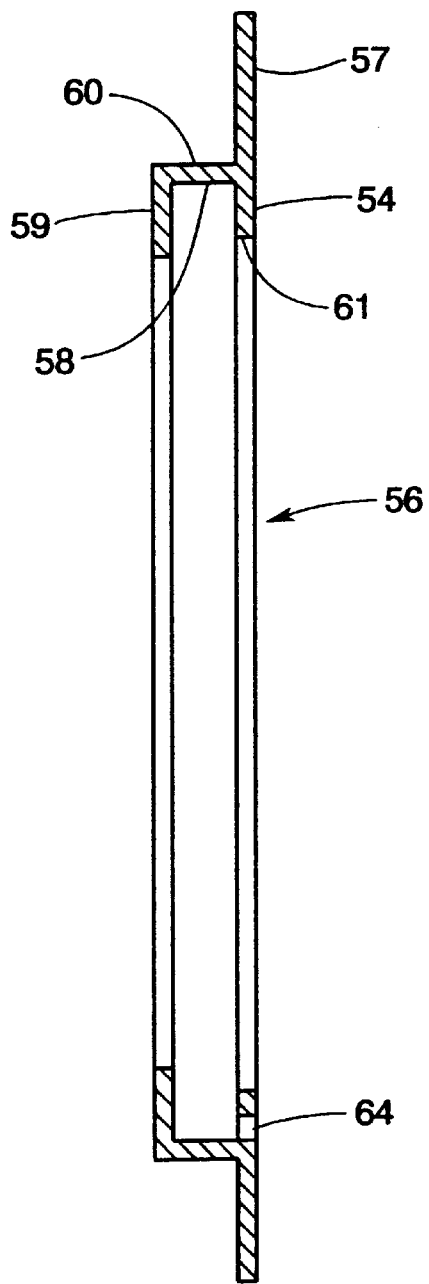
FIG. 6A is a cross sectional side view of the partition plate with first and second parallel walls forming a gutter as shown in FIG. 5.

In another embodiment of the invention as shown in FIGS. 5 through 7, the partition plate with inverted gutter 56 has a clamped portion 57 which is held between the bearing cover 24 and the seal 28 by bolts 55. The partition plate with inverted gutter 56 also has a gutter portion 58 which comprises a protruding portion 54 which terminates in end 61 immediately adjacent outer face 34 of flange 33 on slinger 26.

Lubricant migrating through opening 31 into cavity 47 and engaging the partition plate with inverted gutter 56 will migrate downwardly on inner face 53 of outwardly extending portion 60 downward to drain opening 64 where the lubricant is returned to drain 48 and sump (not shown).

Figure 6B:
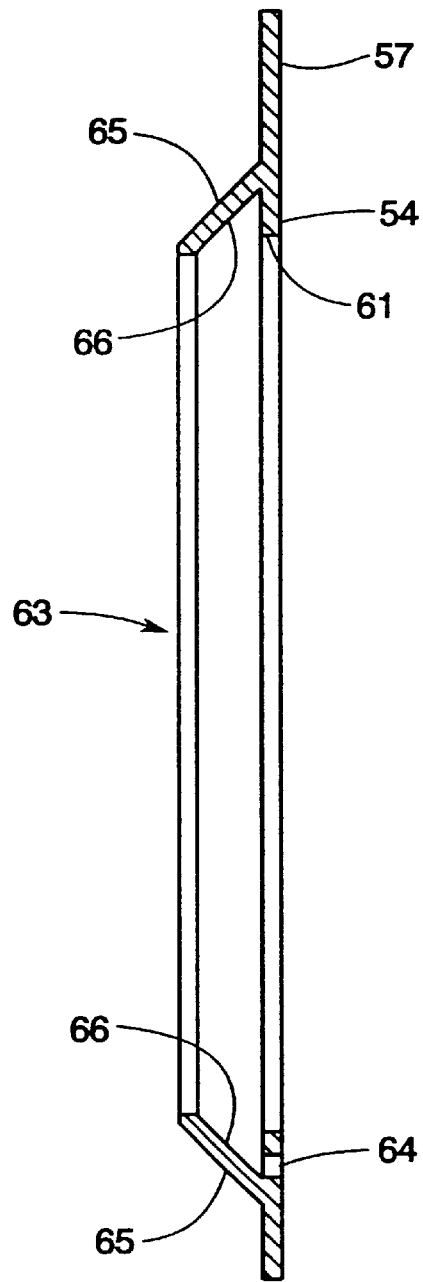
FIG. 6B is a cross sectional side view of the partition plate with first protruding wall and second non-parallel wall forming a gutter.

FIG. 6B shows a variation of the inverted gutter, a partition plate with inverted gutter having an angled wall 63. The angled wall 65 is attached to the protruding portion 54 and extends outwardly therefrom at an angle forming a gutter portion 66.

Another embodiment, as shown in FIG. 8, consists of partition plate 70 having a clamping portion 71, a protruding portion 72, having an end 73 adjacent the outer face 34 of flange 33, as shown in FIG. 5, and having a drain 74 extending through the protruding portion 72 adjacent the bottom thereof. A separate inverted gutter member 75 is placed against partition plate 70 and both are secured between bearing cover 24, as shown in FIG. 5, and seal 28 by bolts 55. The gutter inverted member 75 has clamping portion 76, outwardly extending portion 77 and parallel portion 78. Any lubricant migrating past the slinger 26 into the gutter member partition plate 70 and gutter member 75 will migrate downwardly along the outwardly extending portion 77 and exit the partition plate 70 and gutter member 75 through drain 74 into drain 48 which returns to the sump 36.

FIG. 9 discloses another embodiment of partition plate with gutter 80 having a clamping portion 81 made of steel and a gutter portion 82 made of plastic or composite material that will withstand the temperature range of about 350° F. to about −50° F. The plastic gutter portion 82 may be secured to the metal clamping portion 81 at joint 83 by a suitable adhesive or the plastic material gutter portion 82 may be insert molded to the steel clamping portion 81. The gutter portion 82 has an end 84 at a position which is immediately adjacent the inner face 35 of flange 33 of the slinger 26, as shown in FIG. 5. Lubricant reaching the gutter portion 82 is directed downwardly in a similar manner across sloped surface 85 to drain 48 and sump 36. The plastic and metal portions are joined at joint 83.

Figure 10:
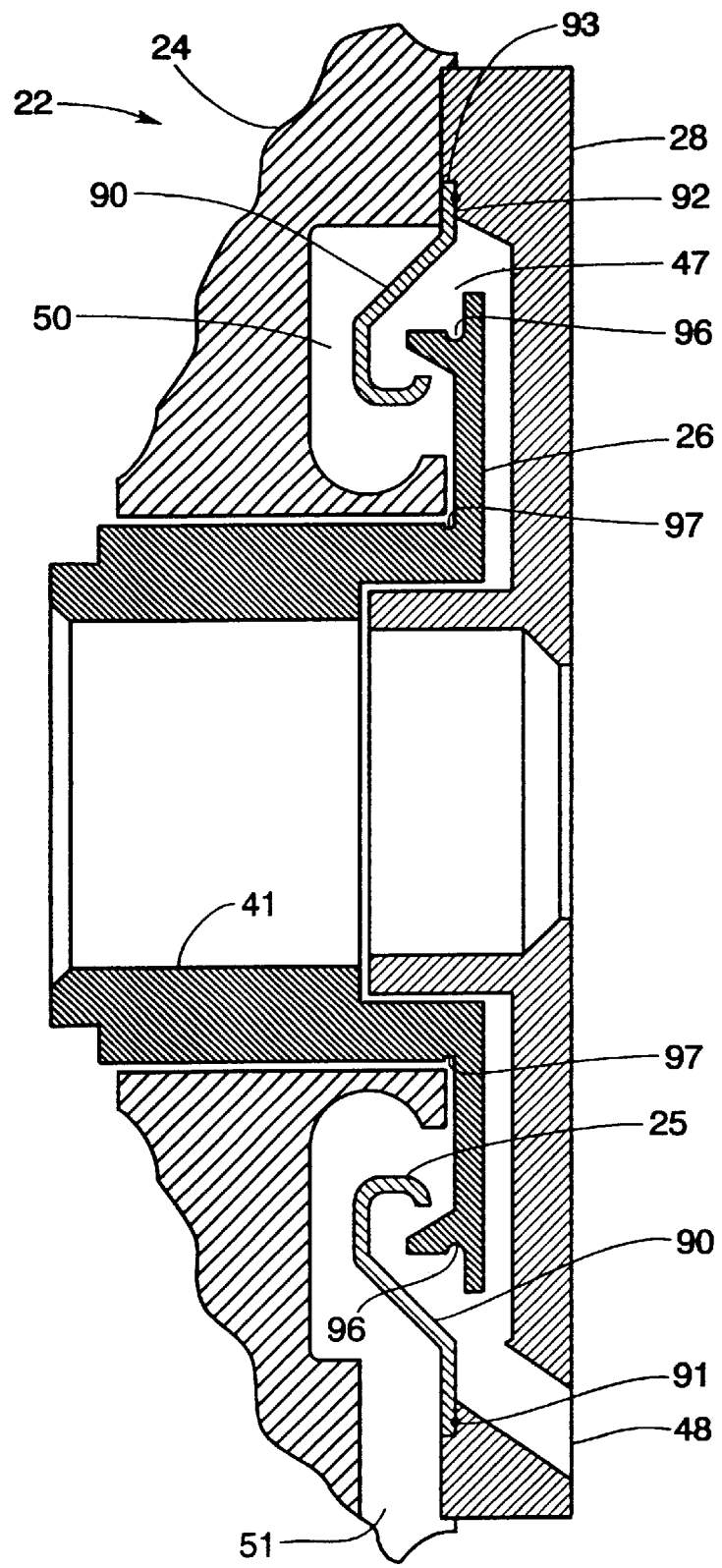
FIG. 10 is a one piece partition plate made entirely of a suitable plastic or composite material, secured in place by raised beads on the clamping portion of the partition plate and protected from crushing by a recess in the seal.

Now referring to FIG. 10, the partition plate with gutter 90 as disclosed is entirely made of plastic material or suitable composite material able to withstand the operative temperature range of the lubricant at an operating temperature of about 350° F. and a non-operating temperature of ambient weather of about −50° F. The one-piece partition plate with gutter 90 is secured in place by raised beads 91 on the clamping portion 92 of the partition plate with gutter 90. The raised beads 91 are compressed when the bearing cover 24 and seal 28 are sealed together by bolts 55. The clamping portion 92 is received in recess 93 of the seal 28. The recess 93 may alternatively be provided in the bearing cover 24. Therefore the clamping portion 92 is not crushed due to the sizing of the recess 93. The bead members 91 are crushed securing the all plastic partition plate with gutter 90 securely in place. The beads 91 crushed in place act as a lubricant seal and prevent lubricant from migrating between bearing cover 24 and seal 28.

Figure 1:
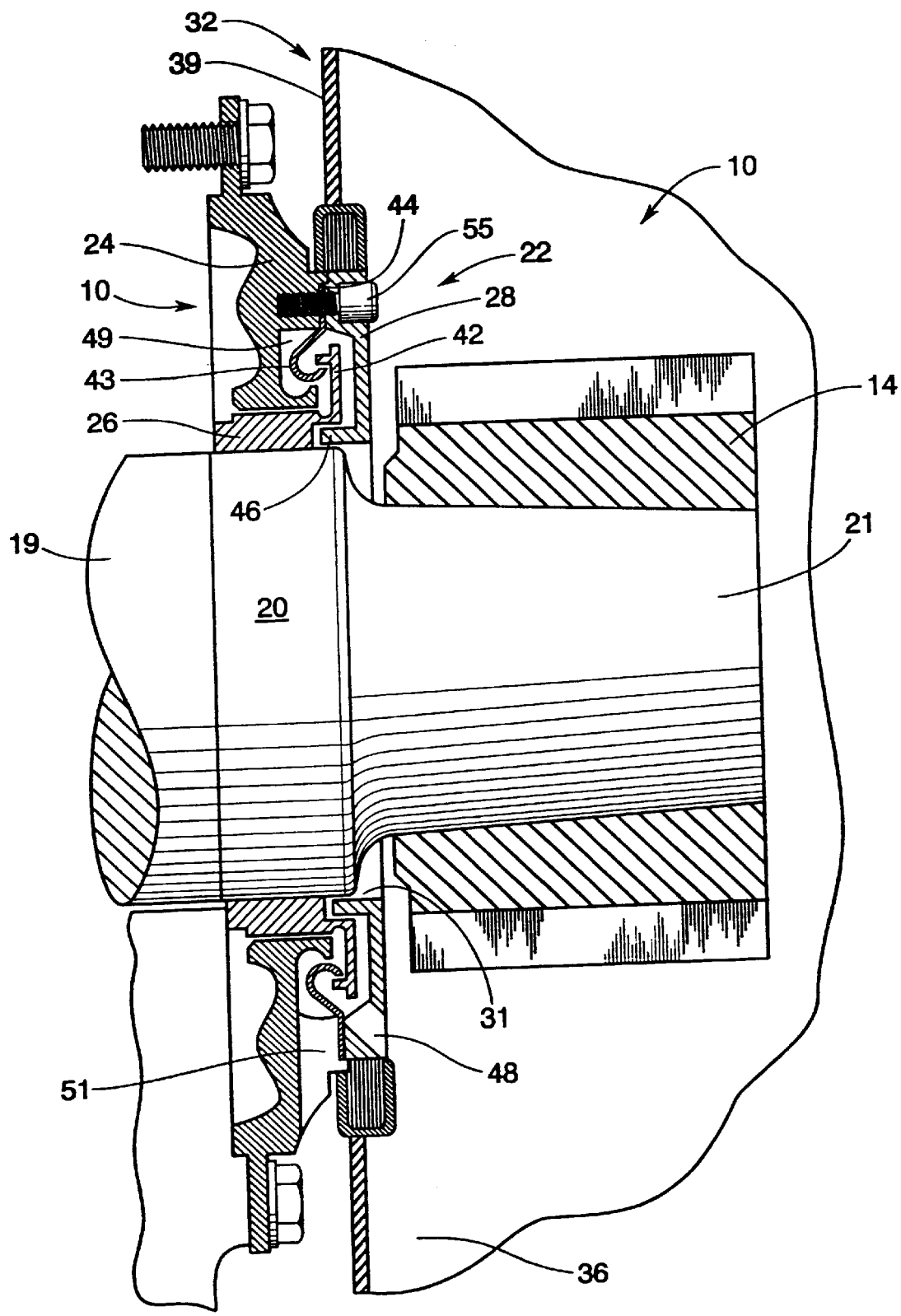
FIG. 1 is a transverse cross-sectional view showing portions of the traction motor, pinion and seal construction and the partition plate with gutter according to the invention.
Figure 2:
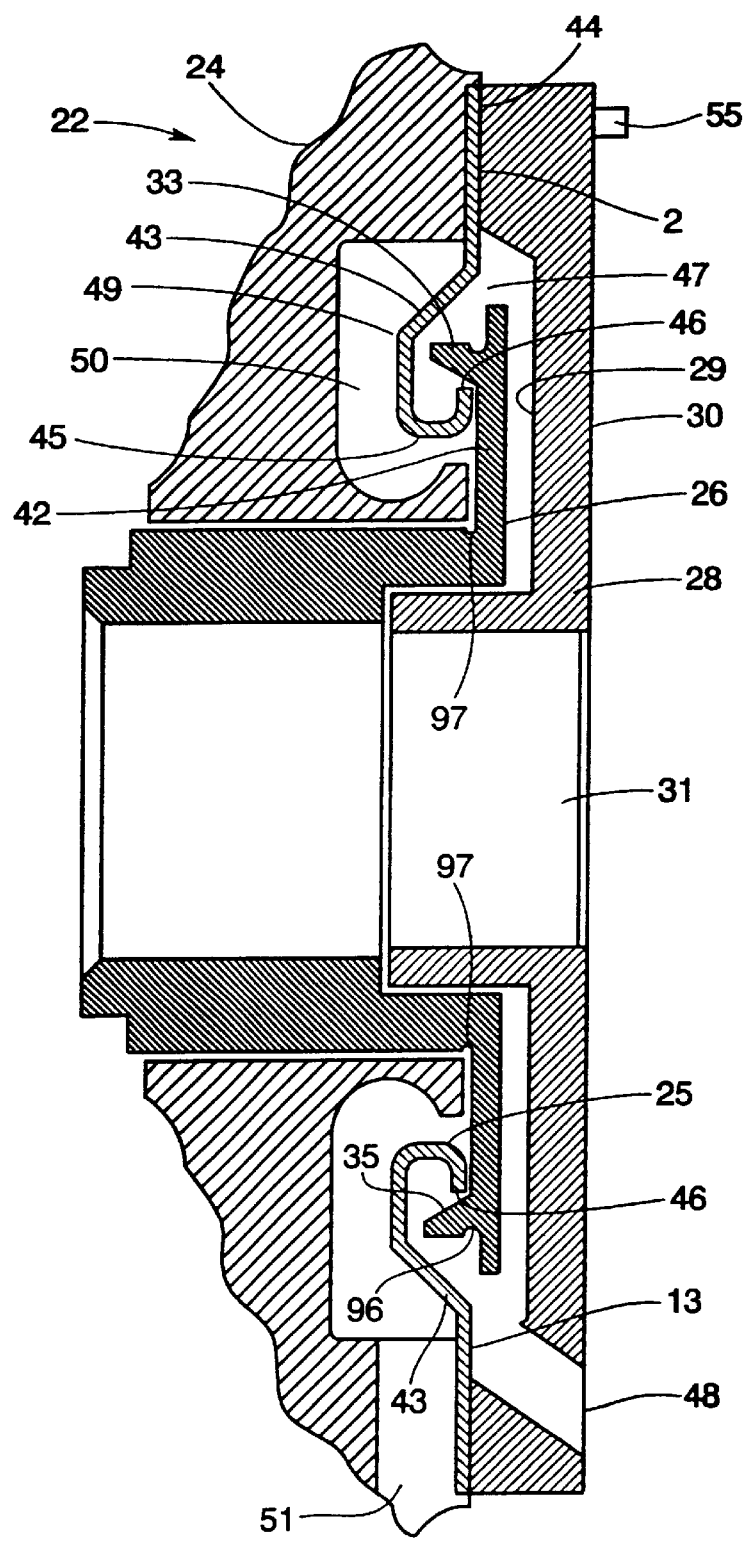
FIG. 2 is a transverse cross sectional view as shown in FIG. 1 with the shaft and pinion removed and showing the partition plate with gutter.
Figure 3:
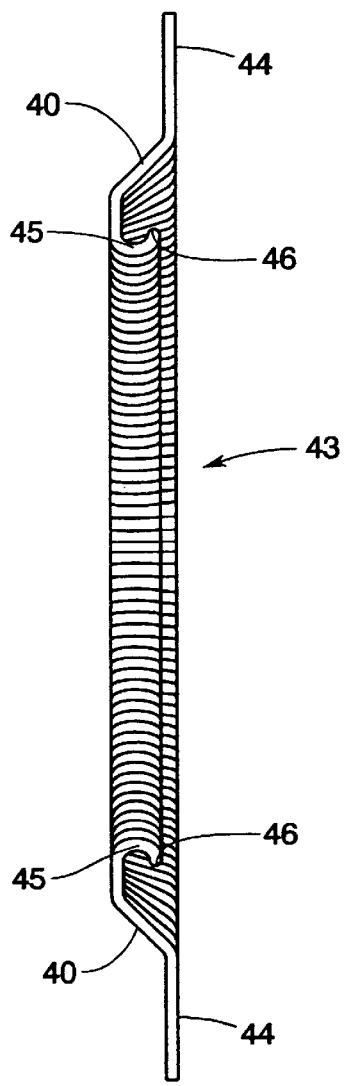
FIG. 3 is a transverse cross-sectional view of the partition plate with gutter, according to the invention.
Figure 4:
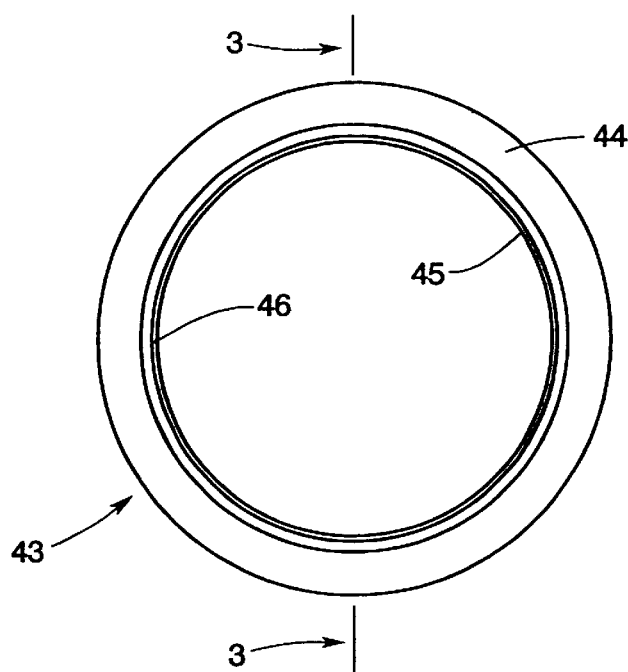
FIG. 4 is a seal side view of the partition plate with gutter according to the invention.

FIGS. 2, 5, and 10 show first radius 96 in the outer face 34 of flange 33. When slinger 26 stops rotation lubricant migrating into first radius 96 will be directed downwardly around the circumference of the slinger 26 where it will enter drain 48 and return to the sump 36. Also shown in FIGS. 2, 5 and 10, is second radius 97 in the base member 41 of the slinger 26. The radius 97 is located adjacent the outwardly extending member 42 of the slinger 26 and extends around the entire circumference of the slinger 26. In a similar manner any lubricant migrating to radius 97 will be directed downwardly to the drain 48 where it will re-enter the sump 36 of the gear case 32.

The combined features of the partition plate with gutter, as applied to the known drive system for railway electric traction drives of the type used on diesel-electric locomotives and other similar products, provide an improved arrangement capable of being applied not only in new assemblies, but also to existing units in the field for substantially reducing the amount of lubricant lost from the gear cases under certain operating conditions. Maintenance expenses and gear failures.

While the invention has been described by reference to one specific embodiment, it should be understood that numerous changes could be made without departing from the spirit and scope of the inventive concepts described. Accordingly, it is intended that the invention not be limited to the described embodiment but that it have the full scope permitted by the language of the following claims.

The embodiments of the invention in which an exclusive property or privilege is claimed are defined as follows:

1. A lubricant seal having no wearing surfaces comprising a labyrinth member, a partition plate and a slinger;

said partition plate being supported in a fixed position around a shaft and spaced therefrom;

said slinger being attached to said shaft, extending generally around said shaft and extending outwardly therefrom;

said slinger has a flange adjacent said outer end, said flange has an outer face and an inner face;

said partition plate having a gutter portion that terminates in an end;

said end of said gutter portion is adjacent said inner face of said flange whereby lubricant migrating along a shaft will enter said gutter portion and be returned to a sump;

said a cavity in said labyrinth member;

said partition plate with said gutter portion and said slinger extend into a portion of said cavity.

2. The seal recited in claim 1 wherein said partition plate has a clamping portion that is attached to a labyrinth member and a sloping portion that is attached to said gutter portion.

3. The seal recited in claim 1 wherein said partition plate is made of steel.

4. The seal recited in claim 1 wherein said partition plate is made of plastic.

5. The seal recited in claim 1 wherein said clamping portion of said partition plate is made of steel and said sloping portion and said gutter portion are made of plastic.

6. The seal recited in claim 4 wherein said clamping portion is received in a recess in a labyrinth member and raised beads are provided on said clamping portion to be crushed when attached to secure said partition plate in place.

7. The seal recited in claim 1 further comprising a first radius in said outer surface of said slinger and a second radius in a base member of said slinger whereby said first radius and said second radius collect lubricant when said shaft is stopped and direct said lubricant back to a sump.

8. A partition plate for use with a slinger to reduce migration of lubricant along a shaft that extends from a gear case to an associated motor bearing;

said slinger being attached to said shaft and rotates therewith;

said slinger extending outwardly from said shaft ending at an outer end and extends generally around said shaft;

said slinger has a flange adjacent said outer end;

said flange having an outer face and an inner face;

said partition plate being attached between said motor bearing and said gear case and extending generally around said shaft;

said partition plate having a gutter portion that terminates at an end;

said end of said gutter portion is positioned adjacent said inner face of said flange whereby lubricant passing said slinger is caught in said gutter portion and directed downwardly and returned to said sump;

a labyrinth member having a cavity therein;

said partition plate with said gutter portion and said slinger extend into a portion of said cavity.

9. The partition plate recited in claim 8 wherein said partition plate has a clamping portion that is attached to a labyrinth member and a sloping portion that is attached to said gutter portion.

10. The partition plate recited in claim 8 wherein said clamping portion of said partition plate is made of steel and said sloping portion and said gutter portion are made of plastic.

11. The partition plate recited in claim 8 wherein said partition plate is made of plastic;

said clamping portion is received in a recess in a labyrinth member and raised beads are provided on said clamping portion to be crushed when attached to secure said partition plate in place.

12. A partition plate for use with a slinger to reduce migration of lubricant along a shaft that extends from a gear case to an associated motor bearing;

said slinger being attached to said shaft and rotatable therewith;

said slinger extends outwardly from said shaft and extends generally around said shaft;

a flange attached to said slinger adjacent its outer end;

said flange having an outer face and an inner face;

said partition plate being attached between said motor bearing and said gear case and extends around said shaft;

said partition plate having an inverted gutter portion comprising at least a protruding portion that terminates in an end;

said partition plate having at least one additional portion forming a path to direct migrating lubricant away from said motor bearing;

a labyrinth member having a cavity therein;

said partition plate with said inverted gutter portion and said slinger extend into a portion of said cavity.

13. The partition plate recited in claim 12 wherein the at least one additional portion comprises a second portion joined to said protruding portion at an angle of less than 90°.

14. The partition plate recited in claim 12 wherein the at least one additional portion comprises an outwardly extending portion attached to said protruding portion and a parallel portion generally parallel to said protruding portion.

15. The partition plate recited in claim 12 wherein said partition plate has a clamping portion that is attached to a labyrinth member and a sloping portion that is attached to said gutter portion.

16. The partition plate recited in claim 12 wherein said partition plate is made of plastic;

said clamping portion is received in a recess in a labyrinth member and raised beads are provided on said clamping portion to be crushed when attached to secure said partition plate in place.

17. The partition plate and slinger recited in claim 12 further comprising a drain through the bottom of said partition plate to allow said lubricant to flow to said sump.

18. A partition plate for use in a labyrinth member with a slinger comprising:

a plate member having a first end, a second end, and a gutter portion therebetween;

the first end attachable to a support member;

the second end positionable adjacent the slinger;

the gutter portion forming a channel whereby lubricant entering the gutter portion will move by gravity to a sump;

a cavity in said labyrinth member;

said partition plate with said gutter portion and said slinger extend into a portion of said cavity.

* * * * *